UNITED STATES PATENT OFFICE.

MICHAEL J. CALLAHAN, OF PITTSFIELD, MASSACHUSETTS, ASSIGNOR TO GENERAL ELECTRIC COMPANY, A CORPORATION OF NEW YORK.

RESINOUS CONDENSATION PRODUCT.

1,091,628.  Specification of Letters Patent.  Patented Mar. 31, 1914.

No Drawing.  Application filed September 12, 1912. Serial No. 719,990.

*To all whom it may concern:*

Be it known that I, MICHAEL J. CALLAHAN, a citizen of the United States, residing at Pittsfield, county of Berkshire, State of Massachusetts, have invented certain new and useful Improvements in Resinous Condensation Products, of which the following is a specification.

The present invention comprises a new resinous composition and the process of making the same. Its object is to provide synthetic resinous or gummy compositions which if desired may be rendered insoluble and infusible, and which are useful for the production of molded articles, electrical insulation, varnishes, etc.

In accordance with my present invention glycerol, $C_3H_5(OH)_3$, or other polyhydric alcohol, is chemically combined with camphoric acid, $C_8H_{14}(CO_2H)_2$, to form a hard, fusible condensation product which may be rendered infusible upon continued heating.

In order to illustrate my invention I will describe the production of a camphoric resin of glycerol. A mixture of 100 parts of camphoric acid and 46 parts glycerol, these being substantially equal molecular proportions, is heated in a suitable receptacle until a sample upon cooling is hard and brittle without stickiness. The two materials form a uniform fusion at about 100° C. and the temperature slowly rises to about 250° C. When the reaction has been completed the material is removed from the container to avoid overheating and at this stage is fusible at a temperature of about 110–130° C. It is completely soluble in acetone, slightly soluble in ethyl and methyl alcohol, but insoluble in benzol and the other common solvents. In appearance it is of clear golden yellow color, brittle and hard. This product dissolved in acetone may be used for impregnating fibrous material such as tape or other electrical insulation, wood or other cellular material. It may also be mixed, for example, by solution in a common solvent such as acetone with a flexible condensation product such as the resin produced by interaction of glycerol and malic acid as disclosed in a copending application, Serial No. 719,989 to form a stronger, tougher product.

When it is desired to convert the resin to an infusible insoluble state it is heated for some time at a temperature below its melting point, for example, at a temperature rising from about 90° C. to about 135° C. At this temperature further condensation or polymerization appears to take place. In a like manner camphoric acid may be combined with other polyhydric alcohols such as glycol, mannitol and the like. The infusible insoluble resin, produced by heating the fusible soluble material either quickly up to 270° C. or slowly at 90–135° C., may be molded by means of pressure, preferably while being heated.

The camphoric resin may be saponified with an alkali, such as a solution of sodium hydroxid, to regenerate glycerol or whatever alcohol was used, with the accompanying formation of the corresponding salt of camphoric acid.

What I claim as new and desire to secure by Letters Patent of the United States, is:—

1. A composition of matter comprising a resinous product of camphoric acid and a polyhydric alcohol, said product being saponifiable with an alkali to regenerate the polyhydric alcohol and form a compound of camphoric acid and an alkali.

2. A composition of matter comprising a hard brittle resinous material produced by heating camphoric acid and glycerol, in molecular proportions at an elevated temperature said product being saponifiable with an alkali to regenerate glycerol and form a compound of camphoric acid and an alkali.

3. A composition of matter comprising a clear infusible resinous material produced by the interaction of camphoric acid and glycerol up to a temperature which completes the reaction said product being saponifiable with an alkali to regenerate glycerol and form a compound of camphoric acid and an alkali.

4. A composition of matter comprising a clear insoluble resinous material produced by the interaction of camphoric acid and glycerol and subsequent heating of the product for a long period of time at a temperature lying in the range from about 90 to 110° C.

said product being saponifiable with an alkali to form glycerol and a compound of camphoric acid and an alkali.

5. The process of making a resinous material which consists in heating a polyhydric alcohol with camphoric acid to the reaction temperature.

6. The process which consists in heating glycerol and camphoric acid in equal molecular proportions until the temperature rises to 250° C. with the formation of a condensation product which upon cooling is hard and brittle..

In witness whereof, I have hereunto set my hand this 3rd day of September, 1912.

MICHAEL J. CALLAHAN.

Witnesses:
NEWTON E. DABOLL,
J. DONALD WOODWARD.